(12) United States Patent
Raskin

(10) Patent No.: US 10,796,002 B1
(45) Date of Patent: Oct. 6, 2020

(54) METHOD AND APPARATUS FOR ESTABLISHING A ROOT-OF-TRUST PATH FOR A SECURE COMPUTER

(71) Applicant: JANUS TECHNOLOGIES, INC., Half Moon Bay, CA (US)

(72) Inventor: Sofin Raskin, Los Altos, CA (US)

(73) Assignee: Janus Technologies, Inc., Half Moon Bay, CA (US)

( * ) Notice: Subject to any disclaimer, the term of this patent is extended or adjusted under 35 U.S.C. 154(b) by 739 days.

(21) Appl. No.: 14/846,768

(22) Filed: Sep. 5, 2015

Related U.S. Application Data

(60) Provisional application No. 62/047,302, filed on Sep. 8, 2014.

(51) Int. Cl.
*G06F 21/00* (2013.01)
*G06F 21/57* (2013.01)
*G06F 21/44* (2013.01)

(52) U.S. Cl.
CPC ............ *G06F 21/575* (2013.01); *G06F 21/44* (2013.01); *G06F 2221/033* (2013.01)

(58) Field of Classification Search
CPC ....... G06F 21/575; G06F 21/57; G06F 21/572
See application file for complete search history.

(56) References Cited

U.S. PATENT DOCUMENTS

| 2008/0196081 | A1* | 8/2008 | Hajji | G06F 21/57 726/1 |
| 2009/0293130 | A1* | 11/2009 | Henry | G06F 21/74 726/26 |
| 2009/0327741 | A1* | 12/2009 | Zimmer | G06F 21/575 713/183 |
| 2012/0216034 | A1* | 8/2012 | Chen | H04L 9/0825 713/153 |
| 2015/0058587 | A1 | 2/2015 | Wang et al. | |
| 2015/0058970 | A1 | 2/2015 | Raskin et al. | |
| 2015/0121054 | A1* | 4/2015 | Wu | G06F 21/74 713/2 |
| 2016/0300064 | A1* | 10/2016 | Stewart | G06F 21/575 |

* cited by examiner

*Primary Examiner* — Alexander Lagor
(74) *Attorney, Agent, or Firm* — Foley & Lardner LLP

(57) ABSTRACT

The present invention relates to methods and apparatuses for establishing a "root-of-trust" path for a computing system. In embodiments, a secure computer system having such a root-of-trust path is implemented by a secure processor in conjunction with a host processor. The secure processor becomes the root-of-trust, providing authenticated and encrypted BIOS boot code for the host processor without the need to modify the host processor's operating system. In one embodiment, the establishment of a root-of-trust is implemented by the secure processor presenting itself to the host processor as an on-board BIOS flash device and the secure processor maintaining the integrity of the BIOS boot code. In additional or alternative embodiments, the establishment of the root-of-trust includes use of a direct communications channel and protocol between the host and secure processors.

17 Claims, 4 Drawing Sheets

METHOD AND APPARATUS FOR ESTABLISHING A ROOT-OF-TRUST PATH FOR A SECURE COMPUTER

CROSS REFERENCE TO RELATED APPLICATIONS

The present application claims priority to U.S. Prov. Appln. No. 62/047,302 filed Sep. 8, 2014, the contents of which are incorporated by reference herein in their entirety.

FIELD OF THE INVENTION

The present invention relates generally to secure computing and more particularly to a method of establishing a root-of-trust path for a computing system utilizing a secure processor in conjunction with a host processor.

BACKGROUND OF THE RELATED ART

Conventional computer systems typically include a host processor that is booted up using BIOS code typically included in a non-volatile memory coupled to the host processor. After the host processor boots, operating systems and application programs can be run on the computer system using functions controlled or managed by the BIOS code. There is therefore a need for making sure this BIOS code and boot process are secure.

SUMMARY OF THE INVENTION

The present invention relates to methods and apparatuses for establishing a "root-of-trust" path for a computing system. In embodiments, a secure computer system having such a root-of-trust path is implemented by a secure processor in conjunction with a host processor. The secure processor becomes the root-of-trust, providing authenticated and encrypted BIOS boot code for the host processor without the need to modify the host processor's operating system. In one embodiment, the establishment of a root-of-trust is implemented by the secure processor presenting itself to the host processor as an on-board BIOS flash device and the secure processor maintaining the integrity of the BIOS boot code. In additional or alternative embodiments, the establishment of the root-of-trust includes use of a direct communications channel and protocol between the host and secure processors.

In accordance with these and other aspects, a secure computer system according to embodiments of the invention includes a secure processor, a host processor, and a root-of-trust path between the host processor and BIOS code for the host processor, wherein the secure processor controls the root-of-trust path, thereby providing authenticated BIOS code for the host processor.

In further accordance of these and other aspects, a method of securing a computer having a secure processor, a host processor and BIOS code for the host processor according to embodiments of the invention includes causing the secure processor to control a root-of-trust path between the host processor and the BIOS code, and providing authenticated BIOS code for the host processor via the root-of-trust path controlled by the secure processor.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects of the invention, to perform a fully secured boot of the host processor of a computer system, a root-of-trust is established where the initial boot code is guaranteed to be secure and authentic and each subsequent stage of the boot process is similarly secured and authenticated. In embodiments, this is accomplished utilizing a companion but separate secure processor that provides a secure and authenticated BIOS boot code for the host processor. The boot process for the secure processor is likewise secure and authenticated. The secure processor can also be responsible for secure upgrades of the BIOS. This can be done manually or remotely through a management system.

Figure 1A:
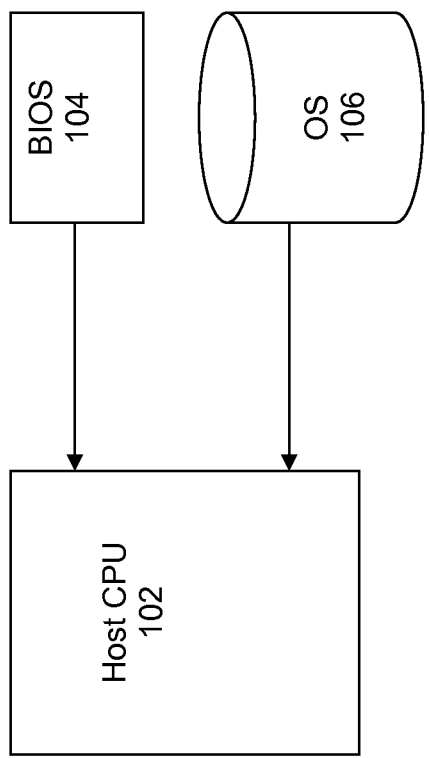
FIG. 1A is a block diagram illustrating access to host BIOS code in a conventional computer system.

To assist in illustrating aspects of the invention, FIG. 1A is a block diagram illustrating an example conventional computer system 100-A. As shown, in a conventional system, a host CPU 102 (e.g. an x86 processor) typically first boots up by accessing BIOS code 104. This code 104 is typically stored in off-chip memory such as ROM or non-volatile RAM. As is known, the BIOS code includes code to initialize and test the system hardware components, and to provide an abstraction layer for the hardware, i.e., a consistent way for application programs and operating systems to interact with the keyboard, display, and other input/output (I/O) devices. Variations in the system hardware are thus hidden by the BIOS from programs that use BIOS services instead of directly accessing the hardware. In x86 example embodiments, the BIOS code can also include a management engine (ME) image.

The BIOS also includes a boot loader for loading operating system (OS) 106 into the CPU 102's program memory (not shown) after successfully booting from the BIOS. Typically, the OS 106 (e.g. Windows, Apple OS, Linux, etc.) is stored in an external mass memory device such as a hard disk drive or an internal solid state memory drive. Once OS 106 is loaded, a user is typically able to use the computer system 100-A to run applications via a graphical user interface (GUI) and peripherals (e.g. keyboard, mouse, etc. not shown). These applications are also typically stored in an external or internal mass memory device and loaded by OS 106 into the CPU 102's program memory.

Typically, CPU 102 and BIOS 104 are integrated together on the same motherboard, while OS 106 can be stored in an external mass memory device such as a hard disk drive as described above or also together on the motherboard as a solid state memory drive. It should be apparent that such a motherboard can include various other components such as peripheral controllers and interfaces, memory controllers, expansion buses (e.g. PCI, PCIe), program memories and the like. However, more detailed explanations of such other components will be omitted here for sake of clarity of the invention.

The present inventors recognize that various security issues can arise due to the boot configuration of the conventional system 100-A. For example, the BIOS code 104 can become corrupted or compromised such as by unknown or unauthorized code (i.e. viruses) being surreptitiously included by a BIOS vendor employee, for example. Such viruses can thus be executed by the host CPU 102 during system 100-A operation, causing the system 100-A to perform operations in the background that are unknown to the user. It should be apparent that many other security issues and types of damaging operations can occur due to an unauthorized or corrupted BIOS being loaded during a boot process.

Figure 1B:
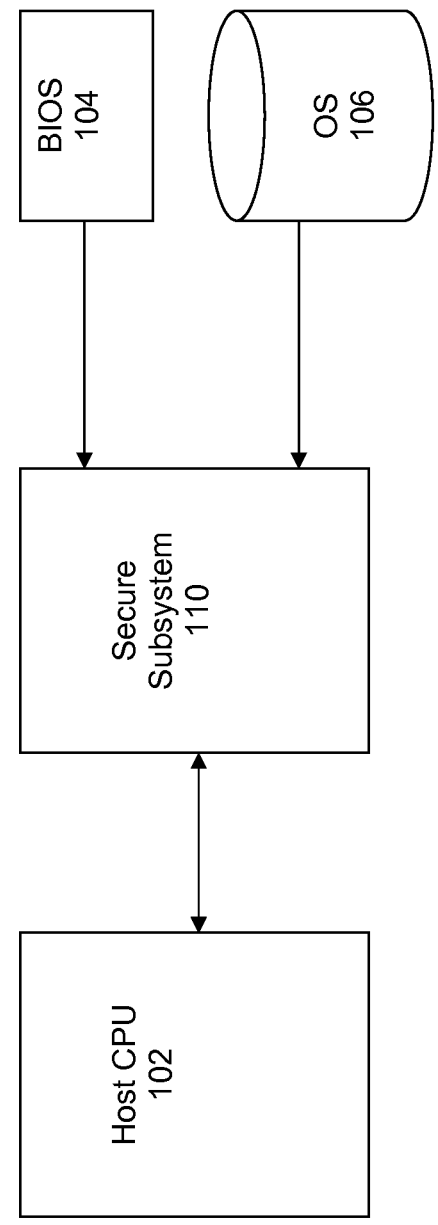
FIG. 1B is a block diagram illustrating access to host BIOS code in a secure computer system according to embodiments of the invention.

FIG. 1B is a block diagram illustrating an example secure computer system 100-B according to embodiments of the invention.

As shown in FIG. 1B, secure computer system 100-B includes a secure subsystem 110 that is interposed in the path between the host CPU 102 and BIOS 104, and preferably as well as in the path between the host CPU 102 and OS 106. According to certain aspects, the configuration of secure computer system 100-B allows the secure subsystem 110 to establish a root-of-trust path for ensuring that authenticated BIOS code 104 is provided to host CPU 102, thereby overcoming the above problems, among others. Various embodiments of how this is performed according to aspects of the invention will be described in more detail below.

Similar to conventional system 100-A, CPU 102, secure subsystem 110 and BIOS 104 are integrated together on the same motherboard, while OS 106 can be stored in an external mass memory device such as a hard disk drive as described above or also together on the motherboard as a solid state memory drive. Further similar to the system 100-A, such a motherboard can include various other components such as peripheral controllers and interfaces, memory controllers, expansion buses, program memories and the like.

Although example implementations of secure computer system 100-B will be described below in connection with desktop or notebook computer configurations, embodiments of the invention are not limited to these configurations, and the principles of the invention can be extended to other types of computer configurations such as thin clients, tablet or pad computers, smart phones, servers, and any other type of computing device such as video conferencing units, ATM machines, industrial controls, etc.

Figure 2A:
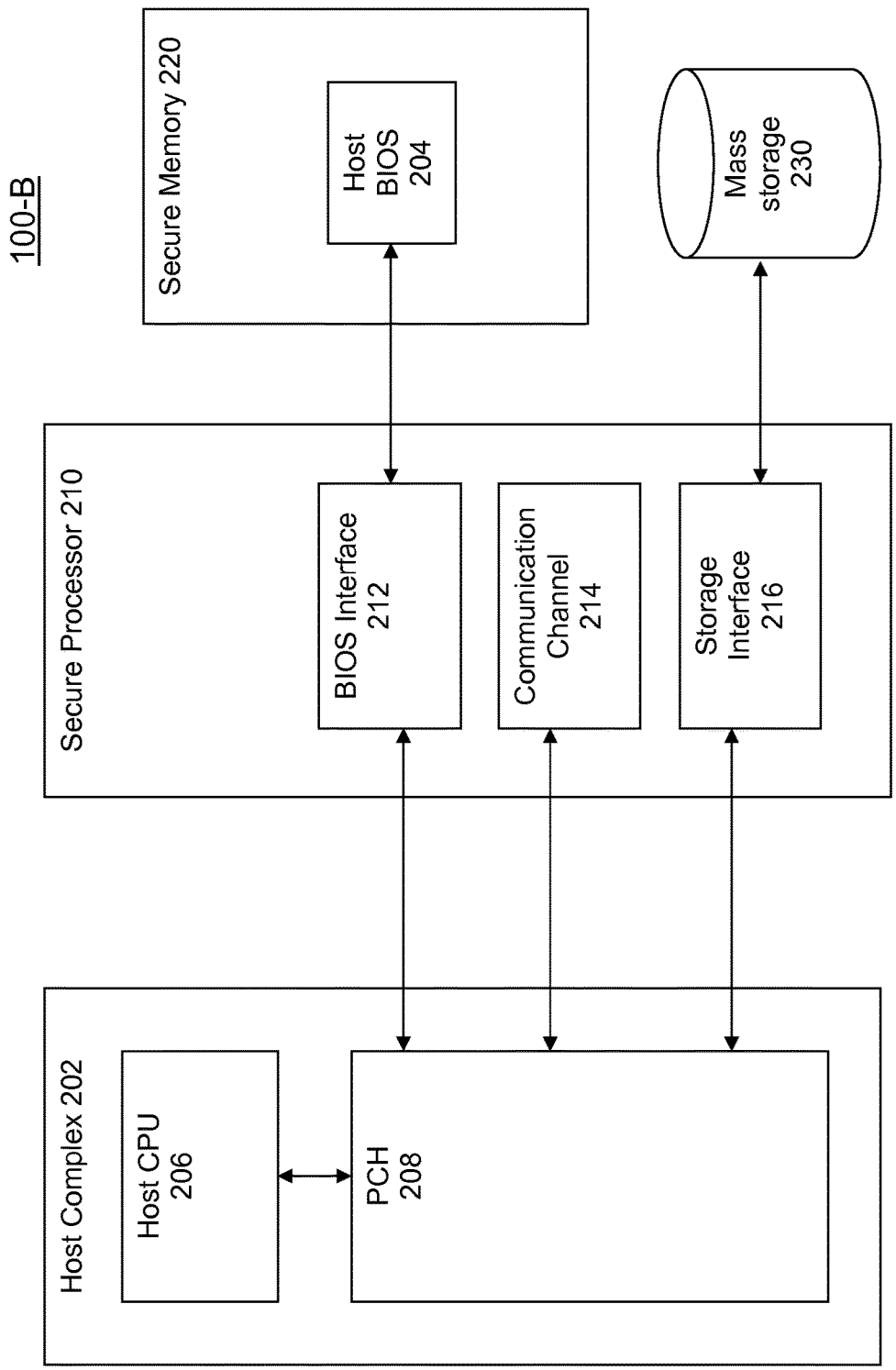
FIG. 2A is a block diagram further illustrating an example secure computer system according to embodiments of the invention.

FIG. 2A is a block diagram illustrating an example embodiment of a secure computer system 100-B according to aspects of the invention.

As shown in FIG. 2A, system 100-B includes a host complex 202, a secure processor 210, secure memory 220 and mass storage 230. According to aspects of the invention, host complex 202, secure processor 210 and secure memory 220 are all integrated together on a single motherboard (i.e. a printed circuit board (PCB)), and communicate with each other via physically secure channels embedded in the motherboard. Mass storage 230 can be implemented by an external storage device such as a hard drive or it may be implemented on the same motherboard such as by a solid state flash memory. It should be noted, however, that the invention is not limited to these examples. As one of many possible alternative embodiments, some or all of host complex 202, secure processor 210, secure memory 220 and mass storage 230 can be commonly integrated in a single integrated circuit chip.

As shown, host complex 202 includes a host processor CPU 206 which comprises an x86 processor from Intel Corp. or AMD. Host complex 202 further includes a platform controller hub (PCH) 208, which for example is a chipset component from Intel Corp.

As further shown in the example of FIG. 2A, secure processor 210 includes a BIOS interface 212, a communication channel 214 and a storage interface 216, the functionalities of which will be described in more detail below. In embodiments, secure processor 210 is implemented as an ASIC (e.g. a JT500 secure processor from Janus Technologies, Inc.) and secure memory 220 is implemented by a NAND flash memory. Although not shown, secure processor 210 further includes a processor core running embedded software and/or operating system (e.g. Linux) and application software stored in secure memory 220 for implementing BIOS interface 212, communication channel 214 and storage interface 216, among other things.

It should be noted that host complex 202 can include other components such as program memory (e.g. DDR memory) for running applications. However, the details thereof will be omitted here for sake of clarity of the invention. Moreover, as is known, in a conventional computer system, a host similar to host complex 202 and including a PCH such as PCH 208 includes direct connections to peripherals such as I/O devices and ports, graphics controllers, network interfaces, hard drives, expansion buses (e.g. PCI, PCIe), etc. According to aspects of the invention, however, host complex 202 does not have any such direct connections. Rather, some or all of them are emulated by and presented to the host complex 202 via secure processor 210, completely transparently to host complex 202 and applications running thereon. Various implementation details of how this can be done in example embodiments of the invention are described in co-pending U.S. patent application. Ser. No. 13/971,677, the contents of which are incorporated by reference herein in their entirety. Various additional details of how storage interface 216 can be implemented according to embodiments of the invention are described in co-pending U.S. patent application Ser. No. 13/971,732, the contents of which are also incorporated by reference herein in their entirety. As such, further details thereof will be omitted here for sake of clarity of the invention.

Returning to FIG. 2A, in contrast to a typical motherboard system and according to aspects of the invention, secure memory 220 stores the host processor CPU 206's BIOS code 204 and secure processor 210 has exclusive access to secure memory 220 (e.g. where the host complex 202, secure processor 210 and the secure memory 220 are commonly integrated on the same printed circuit board, and the secure memory 222 is electrically connected only to the secure processor 210 to the exclusion of any electrical connections to the host complex 202). In these embodiments of the invention, the secure processor 210's BIOS interface 212 emulates a standard serial peripheral interface (SPI) flash memory interface that the host CPU 206 accesses during boot up of host complex 202.

In this use-case, the host CPU 206 does not have its own SPI flash memory for storing the host's BIOS 204. Instead, BIOS interface 212 of secure processor 210 presents a SPI interface and behaves as the BIOS storage device. Thus, when the host CPU 206 boots and begins to attempt to load the BIOS image into its memory via the conventional SPI interface provided by PCH 208, it instead reads it from secure memory 220 by the BIOS interface 212 of secure processor 210 which is directly connected to the SPI interface of PCH 208.

More particularly, in this embodiment, the secure processor 210 controls the reset and power on/off circuitry (not shown) in system 100-B. Accordingly, during a system boot (e.g. when a power switch of the system 100-B is turned on), the secure processor 210 first boots up itself using code stored in secure memory 220. Secure processor 210 then authenticates the host BIOS code 204 in secure memory 220. Authentication may be achieved by BIOS interface 212 performing a simple checksum of the BIOS code 204 or it can include more secure encryption and decryption of the BIOS code 204 by BIOS interface 212 using private/public keys. If the BIOS interface 212 determines that the BIOS code 204 is secure, secure processor 210 then causes CPU 206 to be powered up and begin its boot process. In this case, the conventional SPI signals that are sent by CPU 206 during its boot process are intercepted by the BIOS interface 212 in secure processor 220, and secure processor uses these signals from the CPU 206 to get and return the BIOS code 204 from secure memory to the CPU 206 via PCH 208.

It should be noted that in the example shown in FIG. 2A, the secure processor 210 stores the BIOS image 204 in its non-volatile memory 220. However, in other embodiments, the secure processor 210 may download it from a secure network location. In either case, the secure processor 210 guarantees a secure and up-to-date BIOS image.

Once booted using the secure BIOS code according to embodiments of the invention, host CPU 206 can proceed to load an operating system and application code from mass storage 230 via PCH 208. From the standpoint of host CPU 206, this is done in the conventional manner. According to aspects of the invention and co-pending application, however, access to mass storage 230 by host CPU 206 is secured by storage interface 216 of secure processor 210.

An alternative to the above embodiments of performing memory emulation by the secure processor 210 is for secure processor 210 to control the host CPU's boot process utilizing a secure communications channel between the host complex 202 and secure processor 210 provided by communications channel 214 to be described in more detail below. In this alternative embodiment, joint access from both host complex 202 and secure processor 210 is provided to the host CPU's BIOS memory.

Figure 2B:
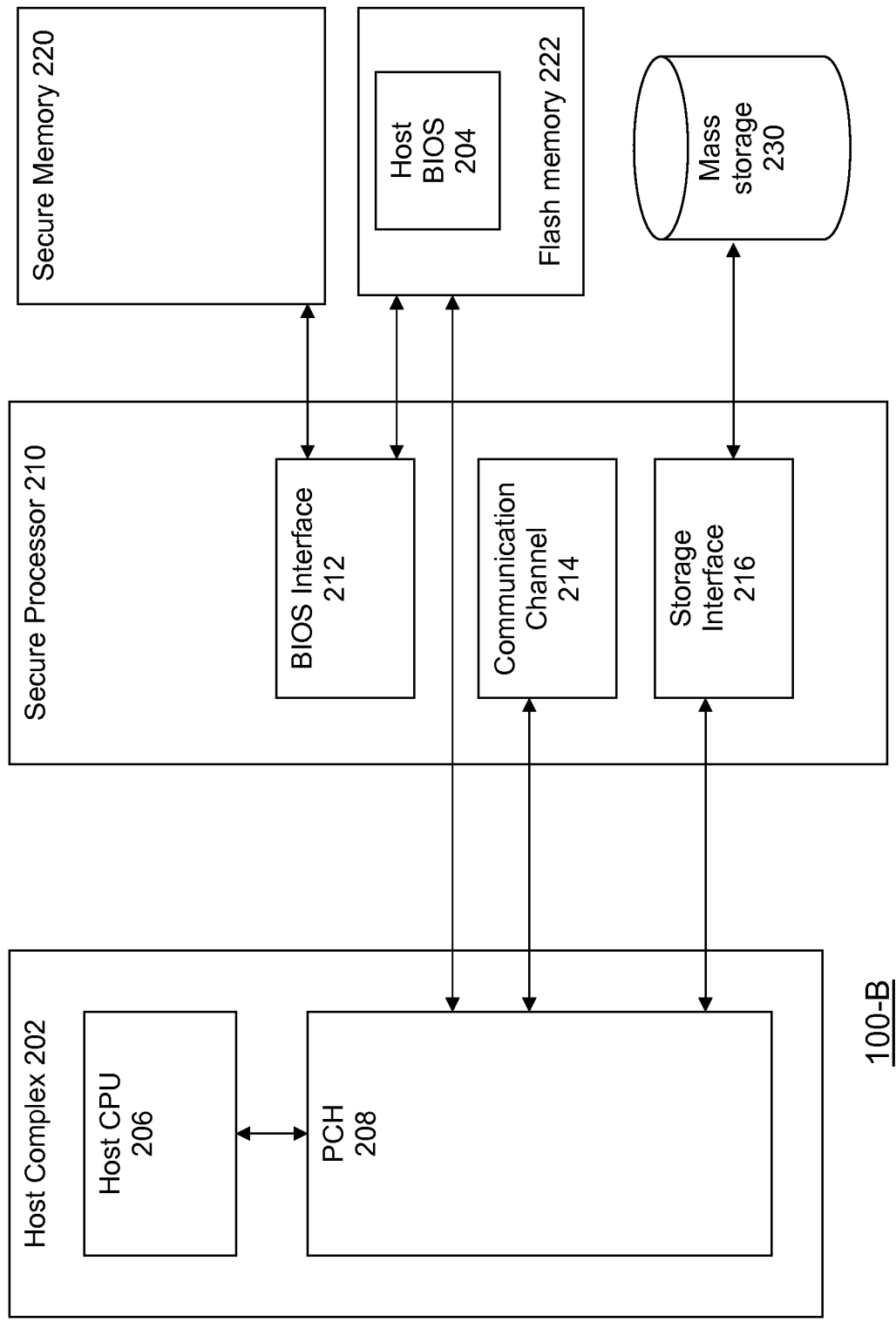
FIG. 2B is a block diagram further illustrating an example secure computer system according to alternative embodiments of the invention.

A block diagram illustrating an example system 100-B according to these embodiments of the invention is shown in FIG. 2B. As shown, in this example, host BIOS 204 is provided in a separate memory device 222 (e.g. a SPI flash BIOS memory) from secure memory 220. In embodiments according to this example, the CPU 206 controls the reset and power on/off circuitry (not shown) in system 100-B.

Accordingly, following power on, both CPU 206 and secure processor 210 begin their boot cycles with each accessing its own respective memories 222 and 220. However, differently from the conventional process, the BIOS code 204 includes only a very preliminary boot, after which it suspends further boot activity. Then the BIOS code 204 causes the CPU 206 to relinquish control of its memory 222 to the secure processor 210 by signaling as such to the secure processor 210 via communication channel 214. After the secure processor 210 completes its boot cycle, and having been granted access to the CPU's memory 222, BIOS interface 212 will then check the contents of the CPU's memory 222 to ensure the correct (authenticated) BIOS code 204 is stored therein. As in the previous example, authentication may be achieved by BIOS interface 212 using a simple checksum or a more secure signing of the image with a private/public key. If the BIOS interface 212 determines that the BIOS code 204 has been tampered with, the BIOS interface 212 will then overwrite the code with a secure BIOS image into the CPU's memory 222. Once the programming is complete and verified, or if the BIOS code 204 was originally found to be authentic, the secure processor 210 signals the CPU 206 via communication channel 214 and the CPU 206 will resume and complete its boot cycle using remaining BIOS code 204 in memory 222.

In another example authentication process, the BIOS code 204 can include code that causes CPU 206 to communicate with BIOS interface 212 via communications channel 214 very early in the process when CPU 206 first begins booting from the BIOS code obtained from SPI flash device 222. These communications can include the BIOS code informing BIOS interface 212 its unique ID or key, which is verified by the BIOS interface 212. If the ID or key is incorrect, the secure processor 210 can prevent the CPU 206 from further booting until it programs a verified BIOS code 204 image into memory 222.

In this example where CPU 206 controls the power on/off circuitry, upon shutdown or entering sleep mode, the CPU 206 will signal the secure processor 210 via communication channel 214 and notify it to initiate a shutdown/sleep mode procedure (e.g. shutting down or suspending all drivers/processes, communicating to a management server, etc.). When complete, the secure processor signals back to CPU 206 via communication channel 214 and CPU 206 shuts down or puts the computer 100-B to sleep.

In any of these and other embodiments, secure processor 210 is able to perform a secure update of the BIOS code 204. For example, upon boot of the host CPU 206, BIOS interface 214 will notify the host processor BIOS 204 that it wants to update its image using the communication channel 214 to be described in more detail below. If the host BIOS 204 approves then the BIOS interface 212 will request access to the SPI flash memory device 222 and write the updated image directly into the device 222. The secure processor 210 will then prepare the PCH 208 for an orderly BIOS reset, in order for the new BIOS image to take effect. It should be noted that this example of a BIOS update can be utilized in embodiments where the subsystem 210 does not emulate the BIOS' SPI interface or if it does not automatically write the BIOS code 204 into the SPI flash memory device 222 upon boot.

It should be noted that various changes can be made to the above examples. For example, in the example system 100-B of FIG. 2B, the secure processor 210 can control the system's power on/off circuitry. In this possible embodiment, upon boot of the host CPU 206, BIOS interface 212 of secure processor 212 can write verified contents of the host BIOS boot code 204 into the SPI flash memory device 222 prior to the host CPU 206 actually booting up. This code 204 can be obtained from secure memory 220 or downloaded from a network as described above.

Example aspects of communication channel 214 for implementing the above and other embodiments of the invention will now be described. In embodiments, communication channel 214 is implemented by a UART interface that connects the secure processor 210 and PCH 208. The UART interface can, in embodiments, run up to 115,200 baud. The UART traces may be embedded in a PCB on which both PCH 208 and secure processor 210 are commonly mounted to prevent external access to probing. It should be noted that the invention is not limited to this example, and the underlying physical interface for communication channel 214 may be based on a standard protocol, such as Ethernet, RS-232, USB, PCIe or a custom interface (e.g. utilizing GPIO).

Embodiments of communication channel 214 provide an inter-processor communication (IPC) channel having a protocol for communicating BIOS settings described in more detail herein.

In these and other embodiments, all BIOS settings are represented by properties. Property is a named value of a particular type and access mode, configuring some aspect of Host Processor BIOS. For example, property system.revision is a read only property of integer type containing a host BIOS revision number. Examples of property types are listed below in Table 1.

TABLE 1

| Type | Comments | Example |
| --- | --- | --- |
| Uint | Unsigned integer value | 123 |
| Bool | Boolean value. Possible values are 0 or 1 | 0 |
| String | Any Latin-1 string | Hello World! |
| Date | Date in yyyy/mm/dd format | 2014/04/22 |
| Time | Time in HH:MM:SS format | 12:30:21 |
| Enum | Enumeration. Possible values aresome particular unsigned integers | 1, 2, 3, 4, 5 |

Table 2 below describes example access modes for the properties above according to embodiments of the invention.

TABLE 2

| Mode | Comments | Property example |
| --- | --- | --- |
| R | Read only | system.revision |
| W | Write only | defaults |
| RW | Read & Write | system.time |

In embodiments, the IPC protocol established by communication channel 214 is based on messages. In one example, a message is a string separated with one or more carriage return (\n) symbols. In other examples, a message may be binary-based and not character-based. The protocol is bidirectional and asynchronous. It allows to get and set values of properties. There are multiple formats of protocol messages as set forth in Table 3 below.

TABLE 3

| Message Format | Direction(s) | Comments |
| --- | --- | --- |
| property.name | Both | Get property value |
| property.name=value | Both | Set property value |
| OK | Both | Confirm successfully processed message |
| ERROR:text | Both | The previously received message cannot be processed. text specifies the error cause |
| Property.name | From secure processor 210 only | Get values for multiple properties |
| . (single dot) | From secure processor 210 only | Get values for all properties |

Note that the use of properties is one method to implement an IPC between the two processors in host complex 202 and secure processor 210. Other implementations are also possible, such as packet or message-based protocols.

In embodiments, the IPC established by communication channel 214 is a symmetric protocol in that each processor may send a command or status to the other at any time. A number of simplified schemes may be implemented including a master-slave configuration or having one (or both) parties listen to commands only during a pre-defined period of operation.

The IPC is preferably designed to be general and support multiple use cases. Below, a number of use cases and their associated messages will be described.

One use case involves communicating a secure motherboard PC power state change. In embodiments, the host CPU 206 manages all power state transitions. In other embodiments, certain aspects of motherboard power state transitions are controlled by the secure processor 210 in addition to or to the exclusion of the host CPU 206. In embodiments where the host CPU 206 controls motherboard power, upon system or user request to transition to a new power state, it will notify the secure processor 210 and let it complete whatever housekeeping tasks it has to do before proceeding. For example, upon system boot, the host BIOS 204 will begin the boot process and immediately handover control of the SPI flash memory device 222 to the secure processor 210. The secure processor 210 will complete its own boot process, initializing all the system I/O (e.g. SATA, networking, USB, etc . . . ) and only then will it return control of the SPI flash device 222 and notify the host BIOS code 204 that it can complete its own boot process. A similar process takes place when the system goes in and out of sleep mode or shuts down.

Figure 3:
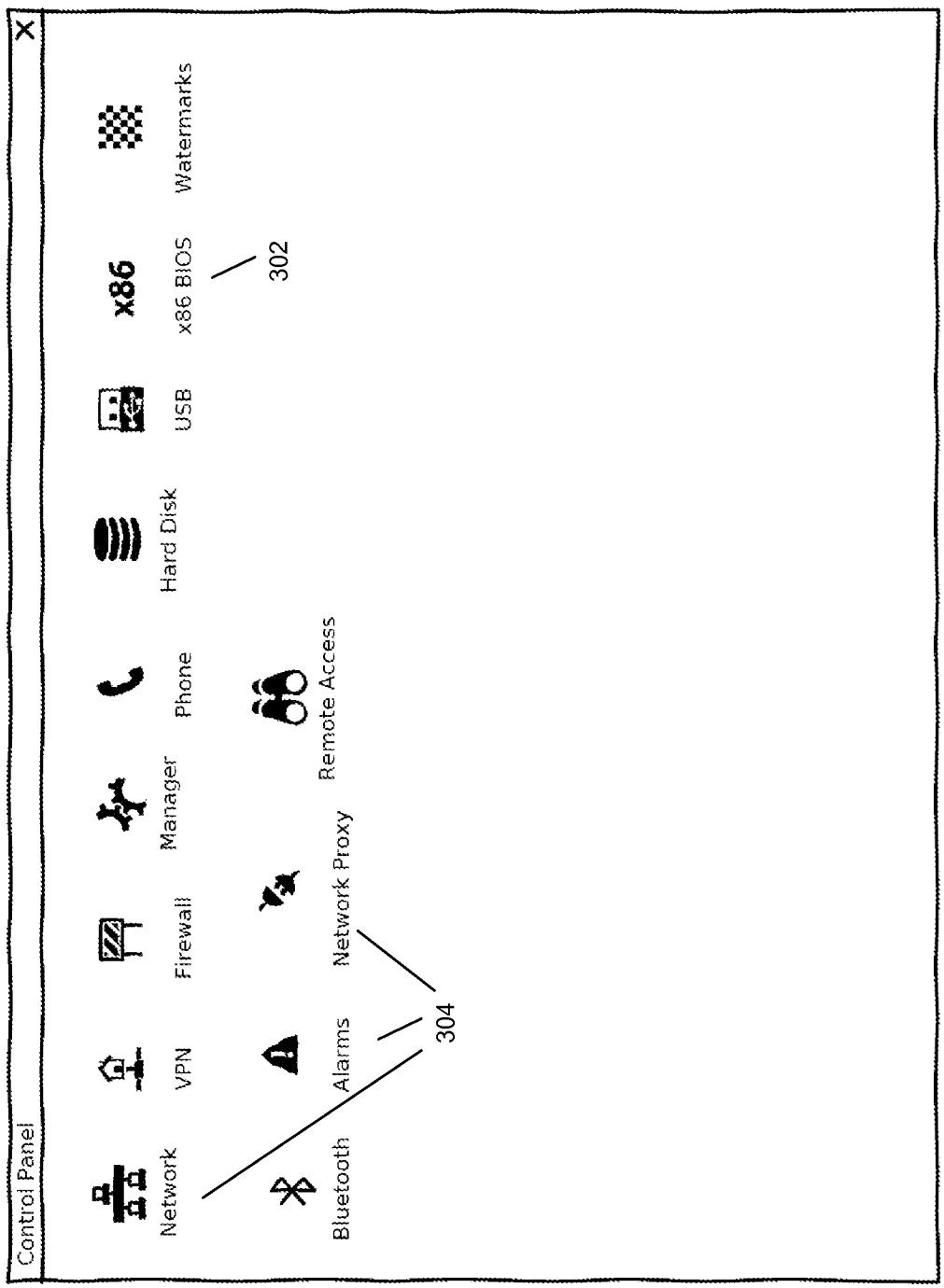
FIG. 3 is a wireframe for an example Secure Processor Control Panel GUI that includes the Host Processor BIOS category according to embodiments of the invention.

Following are example power states of system 100-B that can be communicated between host CPU 206 and secure processor 210: S0: Power on; S3: Suspend to RAM; S4: Suspend to disk; S5: Power off Another use case involves performing host processor BIOS 204 parameter read and write. In these and other embodiments, secure processor 210 is capable of providing a graphical user interface (GUI) that presents the user or system administrator a unified application for the user to review and modify any system configuration, for the host processor BIOS 204 and also for the secure processor 210. FIG. 3 is a wireframe for an example GUI that includes an icon 302 that allows a user to access the host processor BIOS 204 settings according to embodiments of the invention, in addition to other icons 304 for accessing BIOS settings for the secure processor 210.

In embodiments, all BIOS configuration for the system 100-B is done through the secure processor's GUI. In these embodiments, users are not permitted to configure the host BIOS 204 directly through a traditional text-based BIOS interface. The secure processor 210 may store all the default BIOS values in its own memory (e.g. memory 220), as well as default values for the host processor BIOS 204.

In embodiments, the secure processor's BIOS GUI will enable a user to access BIOS settings at any time, including during normal operating system (e.g. Windows or Linux) run-time. This is in contrast to traditional computer systems that are constrained to accessing the BIOS only during boot.

In embodiments, there are two types of BIOS parameters. Static parameters are changed by the user, for example using a BIOS user interface. Dynamic parameters are set by system events, for instance the detection of an external USB device that's plugged in to the system at boot time. If a user modifies a static parameter in the BIOS settings then the BIOS GUI will ask the user to reset the secure system 100-B. The new settings will take effect at the next secure system 100-B boot cycle, after the secure processor 210 writes them into the host BIOS 204. Dynamic parameters are reported by the host processor BIOS 204 to the secure processor 210 at boot time or during run time through the IPC.

In embodiments, each secure computer system 100-B has its own unique system identification parameters that include Host Processor MAC address, Secure Processor MAC address, Serial number and UUID. This information is scanned in by an operator on the assembly line, during system test and stored by the host processor BIOS 204. At boot time, the secure processor 210 can request this information from the host processor BIOS 204, using one of the message commands described above.

According to aspects of the invention, secure system 100-B in the embodiments described above is a fully managed and secure system. All external interfaces are monitored and controlled. In addition, system memory and storage are also closely monitored and backed up. In order to facilitate unobtrusive system memory monitoring, the host processor BIOS 204 may be requested to periodically read snapshots of the host CPU 206's system memory (DDR) and forward it to the secure processor 210 via PCH 208 and channel 214. Other system parameters may also be of interest, such as system power usage, temperature, etc. A possible more general application of this feature is for the secure processor 210 to cause the host BIOS 204 to install a hidden driver that it can call while the host CPU 206 is running the operating system and that can perform various tasks that are requested by the secure processor 210 via communication channel 214.

It should be noted that the embodiments described above in connection with FIGS. 2A and 2B are not necessarily mutually exclusive, and various additional or alternative embodiments of the invention can include certain or all of the components of both embodiments.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

The invention claimed is:

1. A secure computer, comprising:
a secure processor;
a host processor;
a root-of-trust path between the host processor and BIOS code for the host processor,
wherein the secure processor controls the root-of-trust path, thereby providing authenticated BIOS code for the host processor; and
a secure memory for storing the BIOS code, wherein only the secure processor has access to the secure memory to the exclusion of the host processor.

2. A secure computer according to claim 1, wherein the secure processor controls the root-of-trust path by including a BIOS interface that presents itself to the host processor as a BIOS memory device during a boot process of the host processor and provides the BIOS code that is stored in the secure memory to the host processor.

3. A secure computer according to claim 1, further comprising a communication channel between the host processor and secure processor.

4. A secure computer according to claim 3, wherein the communication channel is used to provide a unified BIOS GUI for both the host processor and secure processor.

5. A secure computer according to claim 3, further comprising a memory device for storing the BIOS code, wherein the BIOS code that includes an initial portion that causes the host processor to suspend its boot process and signal to the secure processor via the communication channel to control the root-of-trust path.

6. A secure computer according to claim 5, wherein controlling the root-of-trust path includes the secure processor authenticating the BIOS code stored in the memory device.

7. A secure computer according to claim 6, wherein the secure processor is operative to overwrite the contents of the memory device with another image of the BIOS code if the BIOS code originally stored in the memory device is not authenticated.

8. A secure computer according to claim 1, wherein the host processor and the secure processor are commonly integrated on the same printed circuit board.

9. A secure computer according to claim 1, wherein the host processor, the secure processor and the secure memory are commonly integrated on the same printed circuit board, and the secure memory is electrically connected only to the secure processor to the exclusion of any electrical connections to the host processor.

10. A method of securing a computer having a secure processor, a host processor and BIOS code for the host processor, comprising:
causing the secure processor to control a root-of-trust path between the host processor and the BIOS code;
providing authenticated BIOS code for the host processor via the root-of-trust path controlled by the secure processor;
storing the BIOS code in a secure memory; and
providing access to the secure memory only to the secure processor to the exclusion of the host processor.

11. A method according to claim 10, further comprising:
controlling the root-of-trust path by causing the secure processor to present itself to the host processor as a BIOS memory device during a boot process of the host processor and providing the BIOS code that is stored in the secure memory to the host processor.

12. A method according to claim 10, further comprising establishing a communication channel between the host processor and secure processor.

13. A method according to claim 12, providing a unified BIOS GUI for both the host processor and secure processor via the communication channel.

14. A method according to claim 12, wherein the computer further includes a memory device for storing the BIOS code, the method further comprising:
  including an initial portion of the BIOS code that causes the host processor to suspend its boot process and signal to the secure processor via the communication channel to control the root-of-trust path.

15. A method according to claim 14, wherein controlling the root-of-trust path includes the secure processor authenticating the BIOS code stored in the memory device.

16. A method according to claim 6, further comprising causing the secure processor to overwrite the contents of the memory device with another image of the BIOS code if the BIOS code originally stored in the memory device is not authenticated.

17. A method according to claim 10, wherein providing authenticated BIOS code includes decrypting BIOS code that is stored encrypted on a memory device.

* * * * *